United States Patent [19]
Zellner et al.

[11] Patent Number: 6,078,537
[45] Date of Patent: Jun. 20, 2000

[54] SEMICONDUCTOR CIRCUIT, IN PARTICULAR FOR USE IN AN INTEGRATED MODULE

[75] Inventors: Angela Zellner; Andreas Raeschmeier, both of München; Wolfgang Pockrandt, Reichertshausen, all of Germany

[73] Assignee: Siemens Aktiengesellschaft, Munich, Germany

[21] Appl. No.: 09/255,992

[22] Filed: Feb. 23, 1999

Related U.S. Application Data

[63] Continuation of application No. PCT/DE97/01460, Jul. 10, 1997.

[30] Foreign Application Priority Data

Aug. 23, 1996 [DE] Germany .......................... 196 34 135

[51] Int. Cl.[7] ...................................................... G11C 7/00
[52] U.S. Cl. .......................................... 365/201; 365/228
[58] Field of Search .................................. 365/201, 200, 365/185, 228; 371/21.1

[56] References Cited

U.S. PATENT DOCUMENTS

| | | | |
|---|---|---|---|
| 4,131,942 | 12/1978 | Gillett et al. | 364/200 |
| 4,841,133 | 6/1989 | Gercekci et al. | 235/492 |
| 5,369,299 | 11/1994 | Byrne | 257/638 |
| 5,473,112 | 12/1995 | Doi | 174/35 |
| 5,721,837 | 2/1998 | Kikinis et al. | 395/281 |

FOREIGN PATENT DOCUMENTS

| | | |
|---|---|---|
| 0 172 108 A1 | 2/1986 | European Pat. Off. . |
| 0 378 306 A2 | 7/1990 | European Pat. Off. . |
| 37 06 251 A1 | 9/1987 | Germany . |

OTHER PUBLICATIONS

"Utilize Micro–Encapsulated Conductors to Provide a Tamper Awareness Enclosure for Sensitive Circuits", 2244 Research Disclosure, Dec. 1992, No. 344.

*Primary Examiner*—Richard T. Elms
*Assistant Examiner*—Anh Phung
*Attorney, Agent, or Firm*—Herbert L. Lerner; Laurence A. Greenberg; Werner H. Stemer

[57] ABSTRACT

A semiconductor circuit, in particular for use in an integrated module, has at least one operational assembly with a drive circuit, such as a microprocessor, and a data memory. The semiconductor circuit has at least one initialization assembly for testing and/or for initializing the operational assembly. A disconnectable connecting line connects the operational assembly to the initialization assembly. In order to increase reliability, the initialization assembly is permanently disconnected from the operational assembly, by disconnecting the connecting lines, after the semiconductor circuit has been completed. In order to make it more difficult to reactivate the disconnected connecting lines, the semiconductor circuit has a potential line connected to the initialization assembly and/or to the operational assembly in a region of the connecting line. The initialization assembly and/or the operational assembly are configured in such a way that, when the potential line is connected to the connecting line, the initialization assembly is placed in an inactive state.

10 Claims, 1 Drawing Sheet

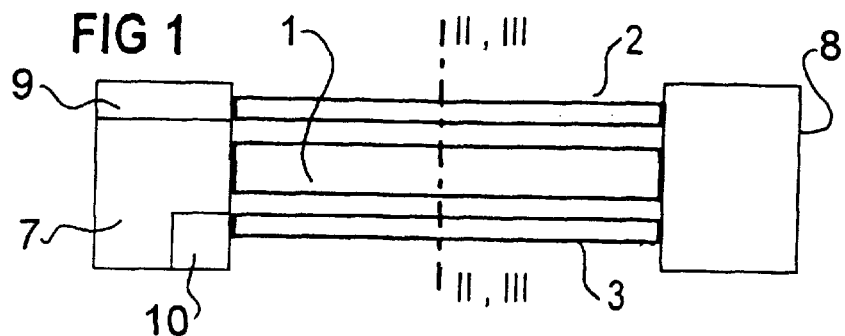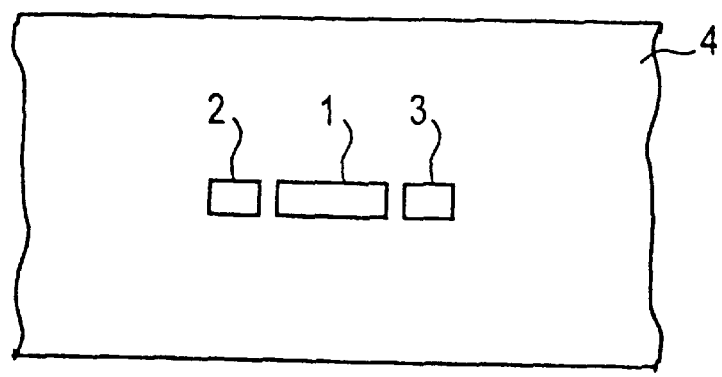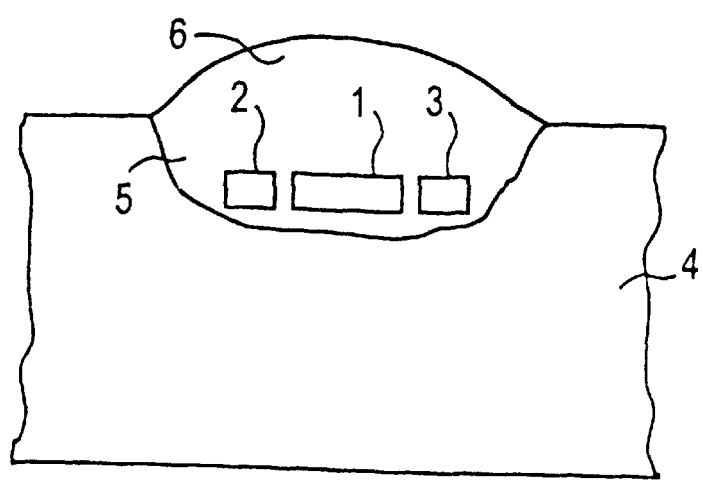

SEMICONDUCTOR CIRCUIT, IN PARTICULAR FOR USE IN AN INTEGRATED MODULE

CROSS REFERENCE TO RELATED APPLICATION

This application is a continuation of International Application PCT/DE97/01460, filed Jul. 10, 1997, which designated the United States.

BACKGROUND OF THE INVENTION

FIELD OF THE INVENTION

The invention relates to a semiconductor circuit, in particular for use in an integrated module. The semiconductor circuit has at least one operational assembly with a drive circuit, such as a microprocessor, and with a data memory. The semiconductor circuit also has at least one initialization assembly for testing and/or for initializing the operational assembly and the operational assembly is connected to the initialization assembly via at least one disconnectable connecting line.

In the above-mentioned semiconductor circuit of the generic type, the data memory is frequently constructed as a non-volatile, programmable data memory. When a semiconductor circuit is being completed, data are written to the data memory, for example with the aid of the initialization assembly. Furthermore, it is possible to place the operational assembly, with the aid of the initialization assembly, in a state in which the operational assembly can be tested. For this purpose, the initialization assembly is connected to the operational assembly via connecting lines. Such connecting lines are made of conductive material, such as a conductive polymer, in particular polysilicon, or metal.

In order to increase the reliability of systems for which the semiconductor circuits of the generic type are used, after the semiconductor circuit has been completed the initialization assembly is permanently disconnected from the operational assembly. As a result, specifically the functions of the initialization assembly are reliably deactivated, so that changes that are undesired in this regard are impossible. For this purpose, after the semiconductor circuit of the generic type has been completed the above-mentioned connecting lines are disconnected. This is done, for example, by electrical firing, by laser cutting or else by mechanical disconnection. In particular in the case in which the connecting lines are interrupted by laser cutting or by mechanical disconnection, the semiconductor circuit is subsequently embedded in an insulating housing material which additionally ensures protection against undesired changes.

In order to make it more difficult to reactivate the disconnected connecting lines for purposes of tampering, it is known in the prior art to dispose the connecting line in the deepest possible layer of the semiconductor circuit. It is then possible to reconnect the free ends of the disconnected connecting line to one another only in a particularly costly and complicated fashion. For this purpose, the connecting line would initially have to be exposed. This is particularly difficult since the layers of the semiconductor circuit that are located above the connecting line have to be removed without destroying the semiconductor circuit. It would then be possible subsequently to make a conductive connection of the free ends of the connecting line. In practice, this does not usually take place, since the semiconductor circuits of the generic type are well protected against undesired changes by the measures described above.

Despite the favorable construction of the semiconductor circuits of the generic type in terms of an undesired reactivation of the initialization assembly, changes to the semiconductor circuit may nevertheless occur.

Published, European Patent Application EP 0 172 108 A1 discloses a semiconductor circuit in an integrated module which has a disconnectable connecting line that is protected between a circuit and a cover plate which is connected to ground. The connecting line can only be reached by a testing probe, if the testing probe penetrates the cover plate, which causes a short circuit in the testing probe. Therefore one can not read a signal of the connecting line with the testing probe. After removing the cover plate the disconnected connection can be reconnected.

U.S. Pat. No. 5,473,112 discloses an integrated semiconductor circuit that regulates access to a non-volatile memory with a logic circuit or via input/output pins with a multiplexer. An initialization line of the multiplexer is protected by screening lines that have a defined potential range. An examination of the semiconductor chip via electronic ray scanning or ion milling causes a short circuit of the initialization line with the screening line, therefore making access to the memory via the input/output line impossible.

SUMMARY OF THE INVENTION

It is accordingly an object of the invention to provide a semiconductor circuit, in particular for use in an integrated module that overcomes the above-mentioned disadvantages of the prior art devices of this general type, which exhibits improved protection against undesired changes.

With the foregoing and other objects in view there is provided, in accordance with the invention, a semiconductor circuit, including: at least one operational assembly having a drive circuit and a data memory; at least one initialization assembly for at least one of testing and initializing the at least one operational assembly; at least one disconnectable connecting line connecting the at least one operational assembly to the at least one initialization assembly; and at least one potential line connected to the at least one initialization assembly in a region of the at least one disconnectable connecting line, the at least one initialization assembly is placed in an inactive state if the at least one potential line is connected to the at least one disconnectable connecting line.

In accordance with an added feature of the invention, the drive circuit is a microprocessor.

With the foregoing and other objects in view there is further provided, in accordance with the invention, a semiconductor circuit, including: at least one operational assembly having a drive circuit and a data memory; at least one initialization assembly for at least one of testing and initializing the at least one operational assembly; at least one disconnectable connecting line connecting the at least one operational assembly to the at least one initialization assembly; and a potential line connected to the at least one operational assembly and disposed in a region of the at least one connecting line, the at least one operational assembly is placed in an inactive state if the at least one potential line is connected to the at least one disconnectable connecting line.

The potential lines of this type make it significantly more difficult to reactivate the disconnected connecting line. The potential lines are specifically disposed as close as possible next to the connecting line whose width is kept as small as possible, specifically in such a way that in an attempt to make contact with the connecting line for the purpose of restoring the electrical connection, an electrically conductive contact or a short-circuit is produced between the connecting line and potential line. Such a short circuit can be sensed by the operational assembly and/or the initialization assembly. In response to the sensing of such a short circuit, the operational assembly and/or the initialization assembly goes into an inactive state, which makes it impossible to monitor and/or modify data in the data memory, and to execute functions of the operational assembly.

Preferably, the potential lines are at a specific, characteristic potential, which can be detected particularly easily by the operational assembly or by the initialization assembly. This makes rapid and reliable detection of an attempt to repair the connecting line possible.

Furthermore, it is advantageous if the connecting line is "buried" together with the potential line in the deepest possible layer of the semiconductor circuit. If the connecting line and the potential line are exposed in an attempt at tampering, then a deep trench is present in the semiconductor circuit in which it is always very difficult to make contact with the connecting line without causing a short circuit to the potential line located next to it. This results in a particularly reliable semiconductor circuit.

In a development of the invention, at least one connecting line and at least one potential line are implemented essentially parallel to one another. Such a semiconductor circuit can be manufactured particularly easily.

Furthermore, at least two potential lines are provided in the region of one connecting line. Such a configuration with a plurality of potential lines around one connecting line provides a particularly reliable embodiment of the semiconductor circuit according to the invention. Then it is in fact virtually impossible to access the connecting line without producing a conductive connection to a potential line, which places the assemblies of the semiconductor circuit in an inactive state. This produces a particularly reliable semiconductor circuit.

Finally, there is provision according to the invention for the semiconductor circuit to be surrounded by an insulating housing. In connection with such an insulating housing, the exposure of the semiconductor circuit and of the connecting line is additionally made more difficult so that undesired changes are made more difficult.

Other features which are considered as characteristic for the invention are set forth in the appended claims.

Although the invention is illustrated and described herein as embodied in a semiconductor circuit, in particular for use in an integrated module, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

FIG. 1 is a plan view of a portion of a connecting line of a semiconductor circuit according to the invention;

FIG. 2 is a sectional view of the portion of the connecting line along the line II—II shown in FIG. 1; and FIG. 3 is a sectional view of the portion of the connecting line according to the invention from FIG. 2 after an attempt is made at a connection.

DESCRIPTION OF THE PREFERRED EMBODIMENTS

In all the figures of the drawing, sub-features and integral parts that correspond to one another bear the same reference symbol in each case. Referring now to the figures of the drawing in detail and first, particularly, to FIG. 1 thereof, there is shown a semiconductor circuit. The semiconductor circuit has an operational assembly 7 with a drive circuit 9, such as a microprocessor, and a data memory 10. The semiconductor circuit also has an initialization assembly 8 and the assemblies 7,8 are to be connected to one another by a connecting line 1 having a width of approximately 1 µm. The connecting line 1 will be disconnected at a disconnection point after the semiconductor circuit has been completed. A first potential line 2 and a second potential line 3 are also provided in a region of the connecting line 1, each spaced apart from the latter at a distance of approximately 1 µm. The potential line 2 and the potential line 3 are at a specific potential, which can be sensed both by the operational assembly and by the initialization assembly.

FIG. 2 shows the detail of the semiconductor circuit from FIG. 1 at the disconnection point in cross-section.

As can be seen particularly well in this view, the connecting line 1, the first potential line 2 and the second potential line 3 are located in a relatively deep layer of the semiconductor circuit surrounded by a housing 4.

FIG. 3 shows the portion of the semiconductor circuit according to the invention from FIG. 2 after an attempt to reconnect to one another the interrupted ends of the connecting line 1 at a disconnection point.

For this purpose, the housing 4 has been eroded away to the level of that layer of the semiconductor circuit in which the connecting line 1, the first potential line 2 and the second potential line 3 are located. At the same time, a trench 5 has been produced in the region of the disconnection point, which trench 5 extends into the housing 4 to such an extent that the connecting line 1 is exposed. In this configuration, the first potential line 2 and the second potential line 3 have also been exposed.

After the trench 5 has been filled with an electrically conductive material 6, the free ends of the disconnected connecting line 1 are electrically reconnected to one another. In the process, an electrically conductive connection has also been produced between the connecting line 1, the first potential line 2 and the second potential line 3. This is sensed both by the operational assembly and by the initialization assembly, so that both assemblies are placed in an inactive state that prevents data in the operational assembly being monitored.

We claim:

1. A semiconductor circuit, comprising:

at least one operational assembly having a drive circuit and a data memory;

at least one initialization assembly for at least one of testing and initializing said at least one operational assembly;

at least one permanently disconnectable connecting line connecting said at least one operational assembly to said at least one initialization assembly, said disconnectable connecting line being permanently disconnected from said operational assembly after the semiconductor circuit has been completed; and at least one potential line connected to said at least one initialization assembly in a region of said at least one disconnectable connecting line, said at least one initialization assembly placed in an inactive state if said at least one potential line is connected to said at least one disconnectable connecting line.

2. The semiconductor circuit according to claim 1, wherein said drive circuit is a microprocessor.

3. The semiconductor circuit according to claim 1, wherein said at least one disconnectable connecting line and said at least one potential line are disposed substantially parallel to each other.

4. The semiconductor circuit according to claim 1, wherein said at least one potential line is one of at least two potential lines disposed in said region of said at least one disconnectable connecting line.

5. The semiconductor circuit according to claim 1, including an insulating housing surrounding said at least one operational assembly, said at least one initialization assembly, said at least one disconnectable connecting line and said at least one potential line.

6. A semiconductor circuit, comprising:
   at least one operational assembly having a drive circuit and a data memory;
   at least one initialization assembly for at least one of testing and initializing said at least one operational assembly;
   at least one permanently disconnectable connecting line connecting said at least one operational assembly to said at least one initialization assembly, said disconnectable connecting line being permanently disconnected from said operational assembly after the semiconductor circuit has been completed; and
   a potential line connected to said at least one operational assembly and disposed in a region of said at least one disconnectable connecting line, said at least one operational assembly placed in an inactive state if said at least one potential line is connected to said at least one disconnectable connecting line.

7. The semiconductor circuit according to claim 6, wherein said drive circuit is a microprocessor.

8. The semiconductor circuit according to claim 6, wherein said at least one disconnectable connecting line and said potential line are disposed substantially parallel to each other.

9. The semiconductor circuit according to claim 6, wherein said potential line is one of at least two potential lines disposed in said region of said at least one disconnectable connecting line.

10. The semiconductor circuit according to claim 6, including an insulating housing surrounding said at least one operational assembly, said at least one initialization assembly, said at least one disconnectable connecting line and said potential line.

* * * * *